July 11, 1961

C. R. GAY ET AL 2,991,818

PNEUMATIC TIRE

Filed Sept. 4, 1957

INVENTORS
CLARENCE R. GAY
THEODORE M. KERSKER
BY
W. A. Fraser
ATTY.

United States Patent Office 2,991,818
Patented July 11, 1961

2,991,818
PNEUMATIC TIRE
Clarence R. Gay and Theodore M. Kersker, Akron, Ohio, assignors to The Firestone Tire & Rubber Company, Akron, Ohio, a corporation of Ohio
Filed Sept. 4, 1957, Ser. No. 682,002
3 Claims. (Cl. 152—356)

This invention relates to pneumatic tires and more particularly to an improved nylon fabric body construction for pneumatic tires.

This application is a continuation-in-part of our copending application Serial No. 493,472, filed March 10, 1955 and now abandoned.

The tire industry manufactures tires having nylon fabric strain bearing cords arranged as plies embedded in rubber to provide load-supporting strength. Generally tires bearing heavy loads must have larger amounts of fabric than tires bearing lesser loads. Therefore, it is expected that when the amount of cord in a tire is reduced to save money or improve ride characteristics, the strength of the tire is reduced.

This invention, however, provides means for reducing the amount of fabric in a tire to decrease thereby the number of plies of cords, reducing the cost of the tire and improving not only the riding characteristics but the strength of the tire. More specifically the invention is directed to a novel two ply nylon tire having a reduced number of plies with improved characteristics of cost, ride and strength over a conventional four ply nylon tire of the same size.

It is therefore an object of this invention to provide a tire having a reduced amount of nylon fabric as compared with a conventional tire of the same size.

It is also an object of the invention to provide a tire having less fabric weight but greater strength than a conventional tire.

These and further objects will be more readily understood by reference to the following specification, claims and drawings of which;

Figure 1:
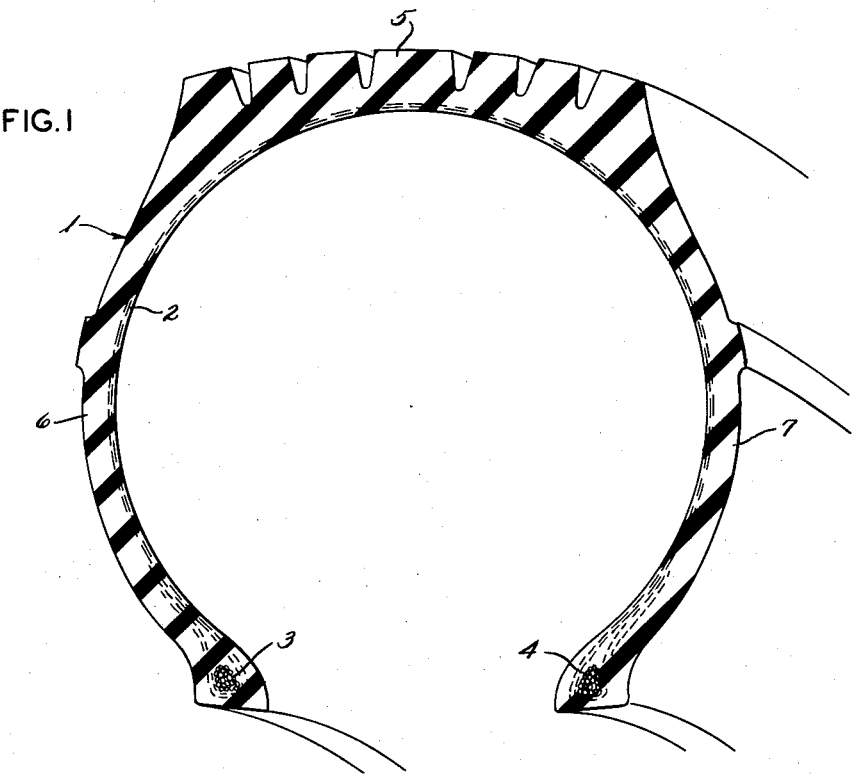
FIGURE 1 is a sectional view in perspective of a tire of the invention.

In reference to FIGURE 1 a pneumatic tire generally indicated at 1 is comprised of a rubberized fabric body portion 2 terminating at its edges in two inextensible bead portions 3 and 4. A rubbery tread 5 is superimposed and bonded as by vulcanization to nylon cord portion 2 and rubbery sidewalls 6 and 7 extend from respective edges of the tread along the fabric body, to which they are bonded, to the bead portions 3 and 4.

Figure 3:
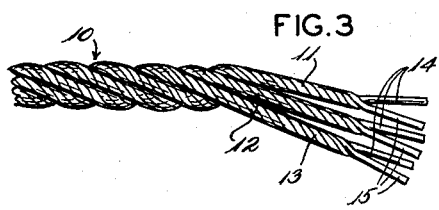
FIGURE 3 is a perspective view of a nylon tire cord in view of the invention.

Referring to FIGURE 3, a nylon cord generally indicated at 10 is made from three strands 11, 12 and 13. Each strand is comprised of two filament yarns such as 14 and 15 twisted to hold them in the desired shape.

In a conventional pneumatic passenger tire, such as a 6.70-15 size which is currently popular, the tire industry uses a construction having a fabric body portion made up of at least four plies of rubberized nylon cord fabric plied up with the cords of successive plies crossing at angles to provide strength. For example, four plies of 840/2 nylon cord fabric are conventionally used in such a 6.70-15 passenger car tire. The number 840 denotes the denier of the nylon filament whereas the number 2 denotes the number of yarns of 840 denier twisted together to form a cord. The total bulk or denier of a 6.70-15 nylon tire is, therefore 1680 x 4 (plies) or 6720 denier. The total weight of nylon cord in such a tire is 1.703 lbs. and the overall cured thickness is approximately .084 inch.

The present invention provides, for example, a 6.70-15 passenger tire having two plies of nylon fabric in the body with an overall cured thickness of only .072 inch and a fabric bulk equivalent of 5040 x 2 (plies) or 10.080 denier. The two ply tire although being stronger than the four ply tire is .012 inch thinner than that tire. The novel feature of the two ply tire is that the denier bulk content of nylon fabric is greater than in the four ply tire but the fabric weight is less or only 1.565 lbs. The two ply tire is less costly than the four ply tire and the ride characteristics are better.

Figure 2:
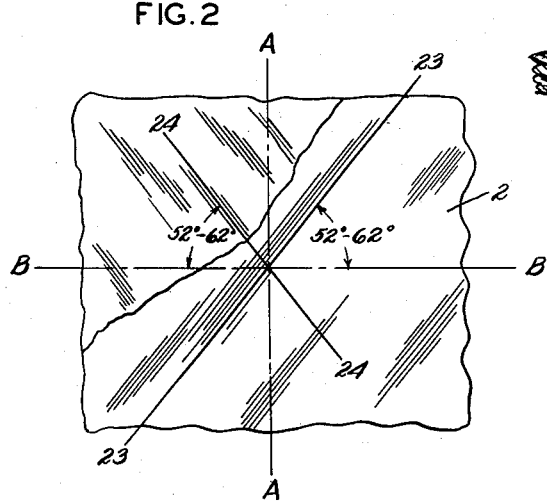
FIGURE 2 is a fragmentary plan view of the body of a tire of the invention showing the angle at which the cords of the two plies intersect.

A tire of the preferred form of the invention has two plies of 840/2/3 rubberized nylon cord fabric with the cords 23 of one ply crossing the cords 24 of the other ply at the crown of the finished tire at an angle with a line B—B parallel to the axis of the tire and at right angles to a middle circumferential line A—A of from 52° to 62° with 58° preferred. This angle is shown in FIGURE 2 where the crown line, A—A, a middle circumferential line with respect to the tire axis on the outer periphery of the tire is at right angles to the line B—B. The critical angle is measured between the cord 23 and line B—B as shown.

The symbol 840/2/3 indicates a cord formed from three strands twisted together, each strand composed of two yarns of 840 denier twisted together. A cord having a denier of 5040 is preferred in the invention but the ply denier may range from 3360 to 7560. Use of only two rubberized plies of fabric the processing of rubberized fabric for a 6.70-15 tire is cut in half. Surprisingly enough, although the finished tire has less fabric weight than the prior art four ply tire, this novel tire has higher body strength as measured by a plunger energy test. The novel tire construction also provides improved ride characteristics and would be expected to build up less heat in operation thereby reducing the possibility of ply separation and tire failure on the vehicel.

6.70-15 size tires according to the invention were built and tested for high speed performance characteristics with the following results:

*Test #1*

|  | Failure Speed, Miles per hour | Miles Run |
|---|---|---|
| 4 ply Nylon (Control In.) 840/2 | 95 | 656 |
| 2 ply Nylon (Novel Tire) 840/2/3 | 100 | 881 |
| 2 ply Nylon (Novel Tire) 840/2/3 | 100 | 895 |

To test the novel tires for high speed performance as above the tires were mounted on standard automobile wheels under a 1,000 lb. load and rotated against a steel wheel having a six foot diameter at a speed of 60 m.p.h. for six hours after which the speed was increased 5 m.p.h. every six hours until the tire failed. The temperature of the air in the tire was recorded as was the speed at which the tire failed. The novel tire as well as being more economical than the control tire was operated at a higher rate of speed and over a greater distance before the tire was destroyed.

Four 6.70-15 tires having the novel construction were mounted on test wheels and inflated to 24 p.s.i. A plunger having an end diameter of 1.0 inch was forced radially against the tread of the tire and the deflection of the tire as well as the force necessary to pierce the tire was reported in terms of plunger energy as follows:

*Plunger test*

4 ply nylon (control tire)____ 7150 (1″ plunger).

2 ply nylon (novel tire)_____ {no break (1″ plunger)  
no break (¾″ plunger).  
3530 (½″ plunger).

The one inch and the three quarter inch plunger would not pierce the two ply tire but only deflected the tire to the rim. To actually pierce the two ply tire a plunger of ½ inch in diameter was necessary. The two ply tire is therefore shown to be considerably stronger than the four ply tire.

The above examples are given by way of illustration only and the invention is not intended to be limited thereto but only by the knowledge of the prior art and the scope of the appended claims.

We claim:

1. A pneumatic tire having a rubberized fabric body portion of not over two plies of rubberized nylon fabric, each of said plies made up of individual cords of twisted nylon material, said cords having a denier of from 3360 to 7560, each said cord forming an angle of from 52° to 62° with a line parallel to the axis of the tire and at right angles to a middle circumferential line on the crown of the tire.

2. A pneumatic tire according to claim 1 wherein the angle is 58°.

3. A pneumatic tire according to claim 1 wherein the denier is 5040 and the angle is 58°.

References Cited in the file of this patent

UNITED STATES PATENTS

| | | |
|---|---|---|
| 1,802,088 | Midgley | Apr. 21, 1931 |
| 2,317,911 | Hoff | Apr. 27, 1943 |
| 2,650,633 | Eger | Sept. 1, 1953 |
| 2,782,830 | Wallace | Feb. 26, 1957 |
| 2,786,507 | Howe et al. | Mar. 26, 1957 |
| 2,826,233 | Cooper | Mar. 11, 1958 |
| 2,869,610 | Lippmann et al. | Jan. 20, 1959 |

FOREIGN PATENTS

| | | |
|---|---|---|
| 526,163 | Great Britain | Sept. 12, 1940 |

UNITED STATES PATENT OFFICE
CERTIFICATE OF CORRECTION

Patent No. 2,991,818                                        July 11, 1961

Clarence R. Gay et al.

It is hereby certified that error appears in the above numbered patent requiring correction and that the said Letters Patent should read as corrected below.

Column 2, line 9, for "10.080" read -- 10,080 --.

Signed and sealed this 28th day of November 1961.

(SEAL)
Attest:

ERNEST W. SWIDER                             DAVID L. LADD
Attesting Officer                                  Commissioner of Patents
                                                                          USCOMM-DC